April 19, 1966  A. E. KRUEGER ETAL  3,246,924
LOCKING MECHANISM FOR FOLDING SEATS
Original Filed Aug. 11, 1960  4 Sheets-Sheet 1

INVENTORS
Alfred E. Krueger &
BY Bewley D. Priestman

J. L. Carpenter
ATTORNEY

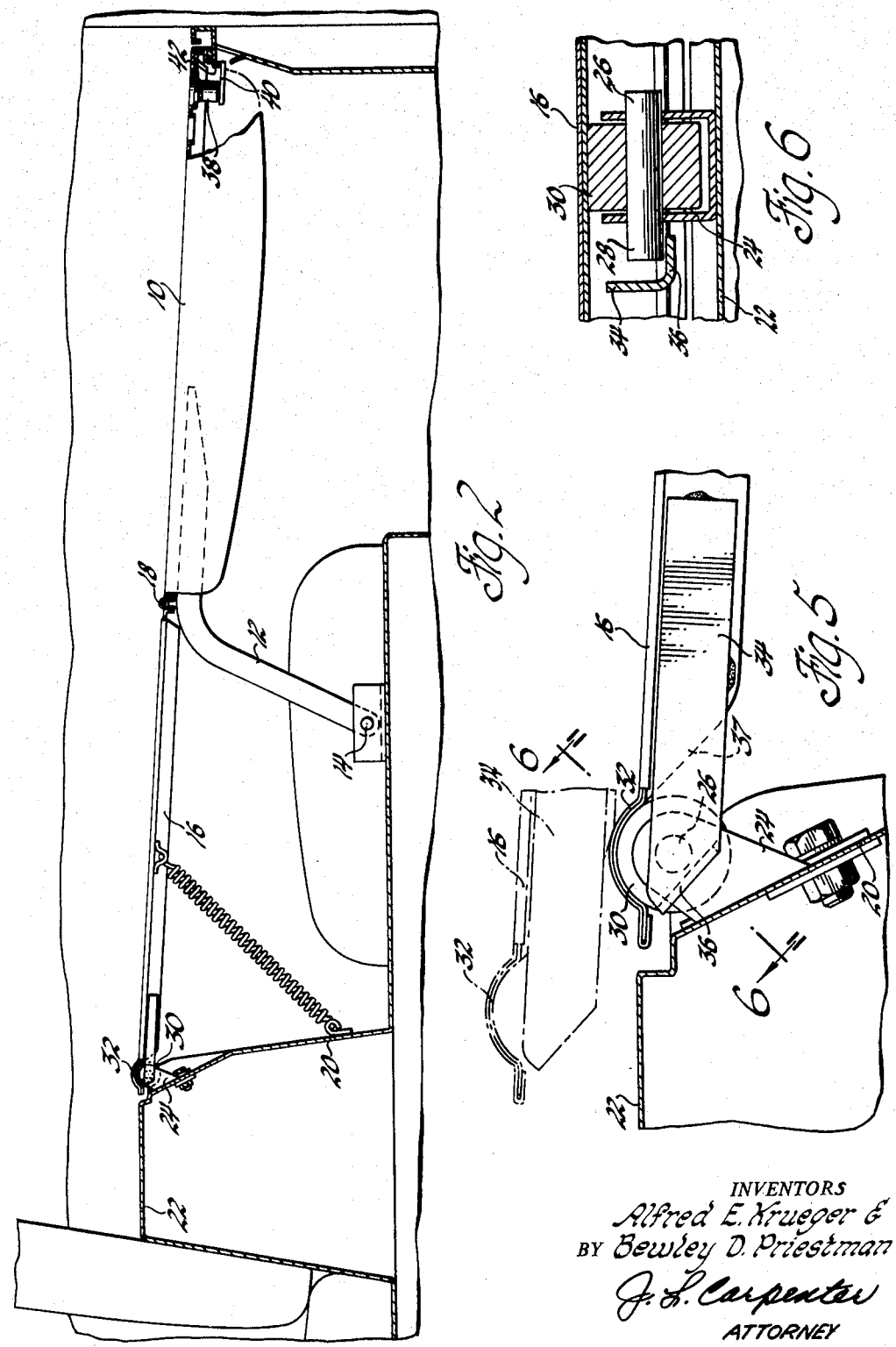

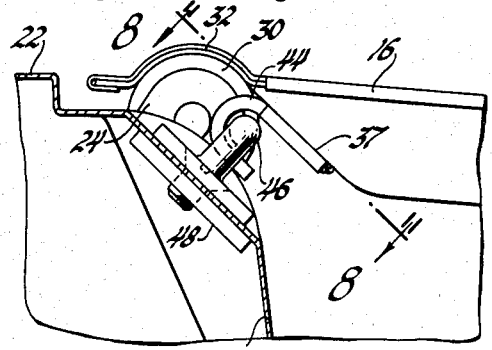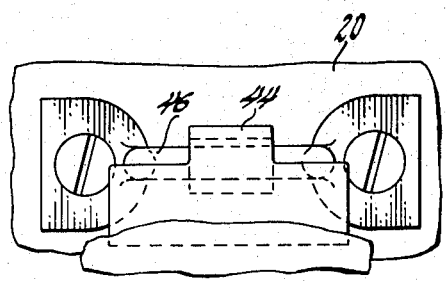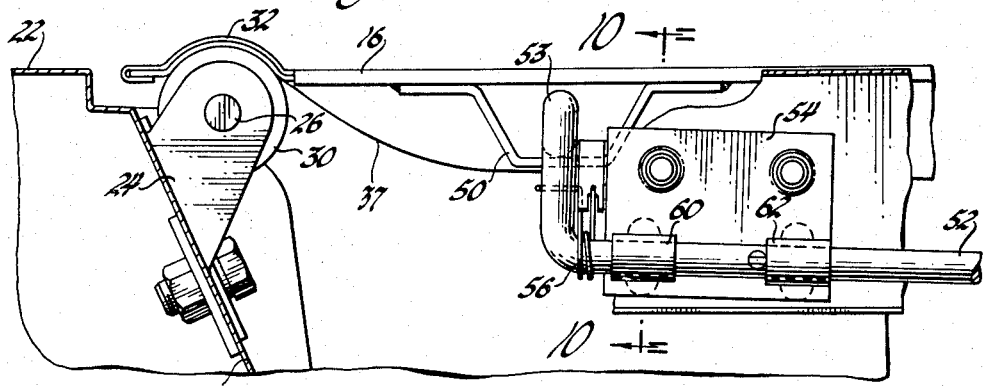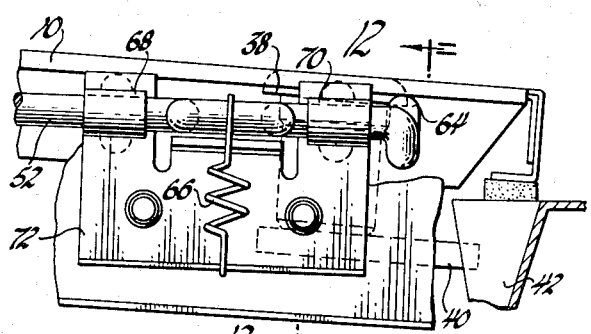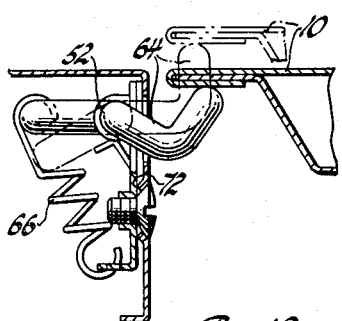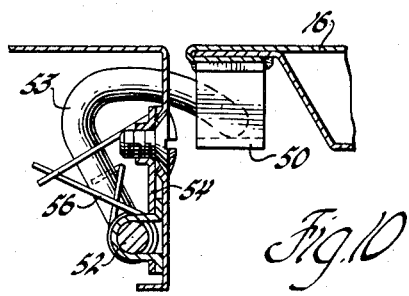
INVENTORS
Alfred E. Krueger &
BY Bewley D. Priestman
J. L. Carpenter
ATTORNEY

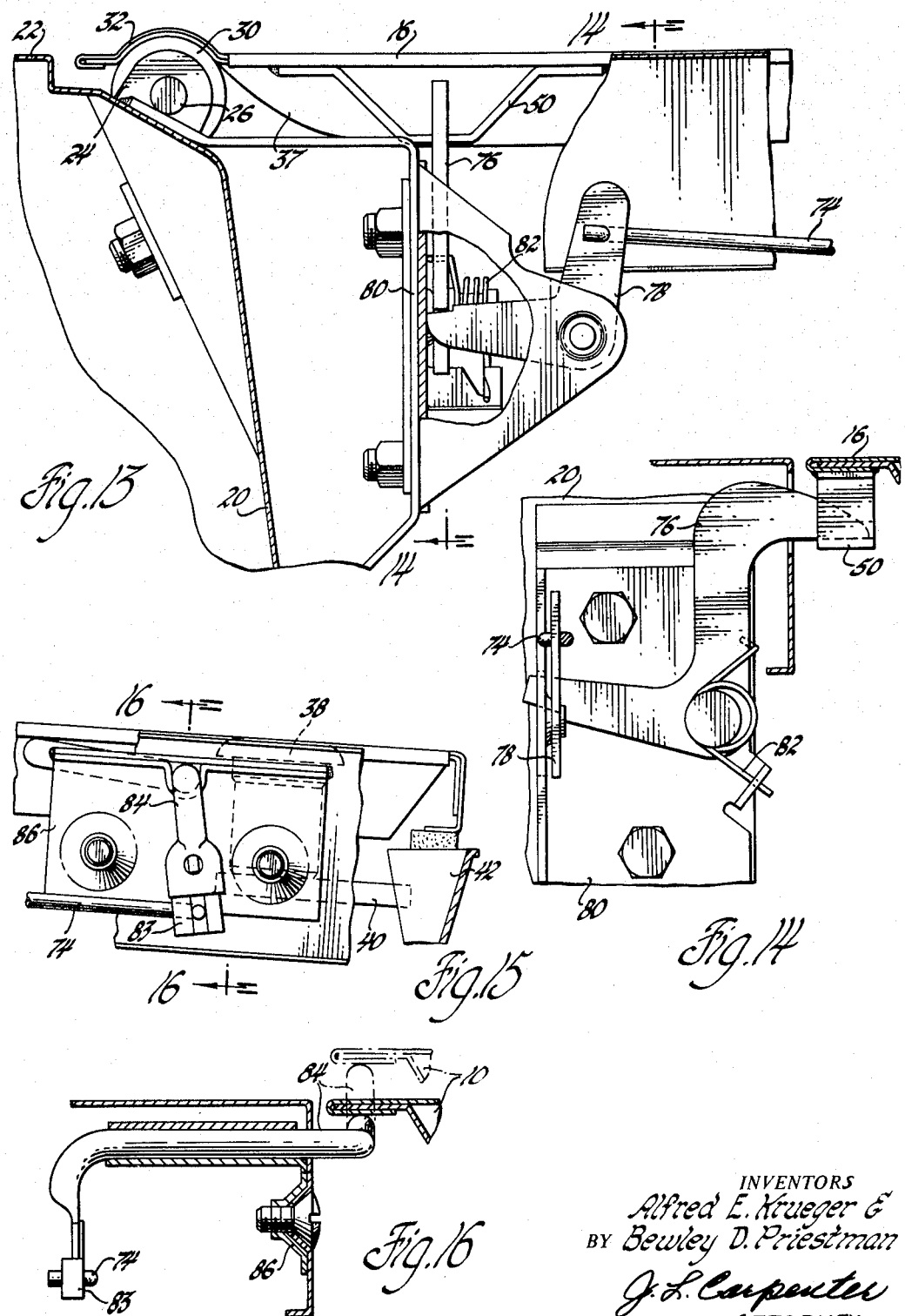

United States Patent Office 3,246,924
Patented Apr. 19, 1966

3,246,924
LOCKING MECHANISM FOR FOLDING SEATS
Alfred E. Krueger, Detroit, and Bewley D. Priestman, Grosse Pointe, Mich., assignors to General Motors Corporation, Detroit, Mich., a corporation of Delaware
Original application Aug. 11, 1960, Ser. No. 48,924, now Patent No. 3,121,585, dated Feb. 18, 1964. Divided and this application May 29, 1963, Ser. No. 284,130
9 Claims. (Cl. 296—66)

This invention relates to vehicle seats and, more particularly, to locking mechanism associated with a folding vehicle seat.

This application is a division of our co-pending application Serial No. 48,924 entitled Locking Mechanism for Folding Seats, filed August 11, 1960 now Patent No. 3,121,585.

Automobiles having station wagon bodies are commonly provided with folding seats that provide an auxiliary floor for transportation of various articles. When the seats are in a folded position which provides the auxiliary floor, we have found it desirable to provide latching mechanism to maintain the seat in the folded floor-forming position.

Accordingly, an object of this invention is to provide improved latching mechanism for holding a folding seat in an auxiliary floor-forming position. Another object of this invention is to provide latching mechanism for a folding seat structure comprising a pivoted seat back which may be pivoted downwardly to a position in which the rear of the seat back provides an extension of the deck or floor of an automobile luggage compartment. A further object of this invention is to provide latching means associated with an auxiliary floor-forming plate associated with the seat back and latch control mechanism operable in response to downward floor-forming positioning of the seat back. Still a further object of this invention is to provide locking means associated with the folding seat to prevent unauthorized access to the area beneath the auxiliary floor.

Other objects and advantages of this invention will be comprehended from the following detailed description and the accompanying drawings wherein:

FIGURE 2 is a side elevational view of a foldable vehicle seat embodying the present invention, in a folded or floor-forming position;

FIGURE 5 is an enlarged detail view of the latching apparatus shown in FIGURE 4 in the folded position;

FIGURE 6 is a sectional view taken along the line 6—6 in FIGURE 5;

FIGURE 7 is a detail view of alternative latching mechanism useable with the apparatus shown in FIGURE 2;

FIGURE 8 is a sectional view taken along the line 8—8 in FIGURE 7;

FIGURE 9 is a partial elevational view of a portion of another alternative embodiment of the invention;

FIGURE 10 is a sectional view taken along the line 10—10 in FIGURE 9;

FIGURE 11 is a partial elevational view of another portion of the embodiment of FIGURE 9;

FIGURE 12 is a sectional view taken along the line 12—12 in FIGURE 11;

FIGURE 13 is a partial elevational view of another alternative embodiment of the invention;

FIGURE 14 is a sectional view taken along the line 14—14 in FIGURE 13;

FIGURE 15 is a side elevational view of another portion of the embodiment shown in FIGURE 13; and FIGURE 16 is a sectional view taken along the line 16—16 in FIGURE 15.

Figure 1:
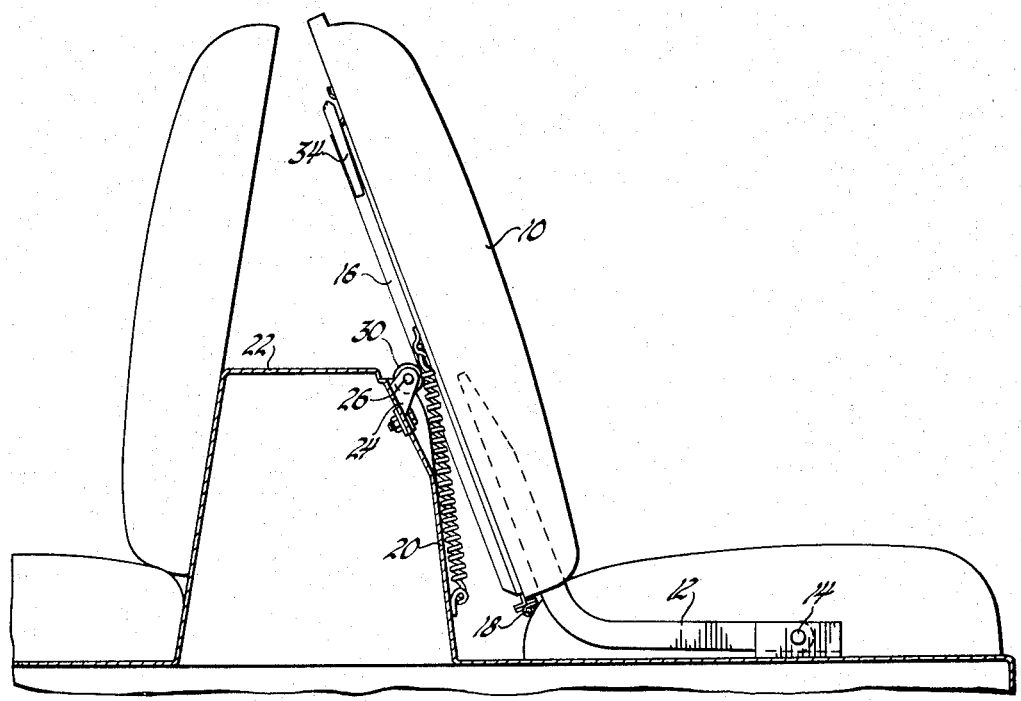
FIGURE 1 is a side elevational view of a foldable vehicle seat in an upright or seat-forming position.
Figure 4:
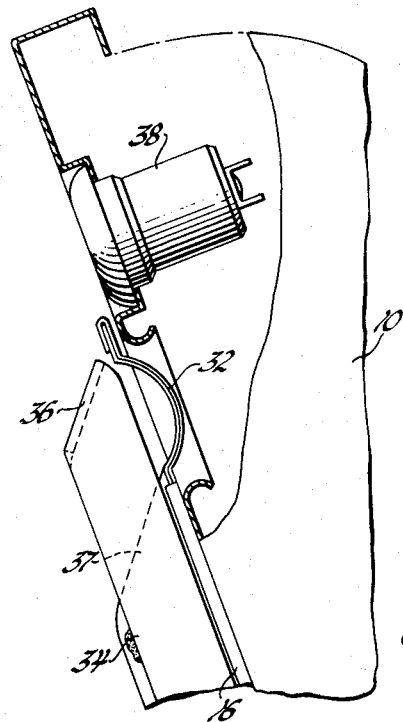
FIGURE 4 is an enlarged detail view of another portion of the latching mechanism on the seat-forming position.
Figure 3:
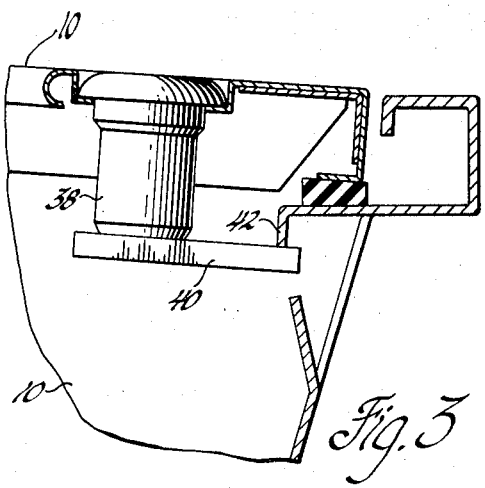
FIGURE 3 is an enlarged detail view of a portion of the latching mechanism associated with the foldable vehicle seat shown in FIGURE 2.

Referring now to the drawings, a seat back 10 is pivotally supported on a hinge 12 about the pivotal connection 14 and is movable from the upright seat-forming position shown in FIGURE 1 to the folded auxiliary floor-forming position shown in FIGURE 2. An auxiliary floor-forming panel 16 is pivotally connected to the lower edge of the seat back by a hinge 18. In the illustrative embodiment, the seat described is the rearwardly facing third seat of the current station wagon designs. An upwardly extending portion of the vehicle floor panel 20 is provided in the space adjacent the seat back 10 in the upright position and includes an auxiliary floor-forming top surface 22. A support bracket 24 is fixed to the panel portion 20 and supports a pin member 26 having one end extended to provide a striker 28 as shown in FIGURE 6. It is to be understood that a similar pin member and the hereinafter described associated latching mechanism may be provided on both sides of the seat. A roller member 30 is rotatably supported on the pin member 26 and is engageable with an outwardly curved portion 32 of the auxiliary floor-forming panel 16 in the floor-forming position. As the seat back 10 is moved between the upright position and the floor-forming position, the underside of the auxiliary floor-forming panel 16 slidingly engages the roller member 30 as the auxiliary panel rotates on the hinge 18 relative to the seat back between an upright position closely substantially paralleily adjacent the seat back and an auxiliary floor-forming position. As shown in FIGURES 4 and 5, a hook plate 34 is suitably secured to the underside of the auxiliary floor-forming panel 16 and has a hook extension 36 positioned outwardly away from and parallel to a guide surface 37 that is contiguous with the curved portion 32 so that the hook extension will be positioned behind the striker portion 28 of the pin member 26 as the auxiliary floor-forming panel 16 slides downwardly on the roller members 30 to the floor-forming position. Referring now to FIGURES 3 and 4, the upper end of the seat back 10 is provided with a conventional key cylinder 38 which is operatively associated with a locking plate 40 adapted to lockingly engage a striker flange 42 provided on the vehicle body adjacent auxiliary floor-forming position of the upper end of the seat back.

An alternative latching construction is illustrated in FIGURES 7 and 8 and comprises a U-shaped hook member 44 that is suitably secured to the outwardly curved surface 37 of the auxiliary floor-forming panel 16 and adapted for engagement with a striker bar 46 secured to the floor panel portion 20 by a tapping plate 48 or other suitable device.

Referring now to FIGURES 9 and 10, a modification providing latch actuating mechanism responsive to seat back positioning is illustrated and comprises a striker flange 50 welded or otherwise suitably fastened to the underside of the auxiliary floor-forming panel 16 inwardly of the outwardly curved surface 37. A rod member 52 having a transversely bent hook portion 53 is rotatably supported by a bracket 54 secured to a side panel of the vehicle body or other suitable support and is adapted for latching engagement with the striker flange 50 in the floor-forming position. A torsion spring 56 biases the hook portion 53 toward an unlatched position. The hook portion 53 is formed integrally with the control rod 52 and is rotatably supported by bushings 60, 62 which are secured to the bracket 54. The control rod extends rearwardly beneath the auxiliary floor line to a position adjacent the top of the seat back in the auxiliary floor-forming position. As shown in FIGURES 11 and 12, the rearward end of the control rod 52 is upwardly bent to form an actuator arm 64 that is engageable with a portion of the seat back 10 and is provided with a spring member 66 to bias the actuator arm in an upwardly extending position shown in phantom in FIGURE 12. The rod is rotatably supported within bushings 68, 70 attached to a bracket 72 that is fixed to a side panel of the vehicle body or other suitable support. As hereinbefore described, a key cylinder 38, locking plate 40 and striker flange 42 are provided to lock the seat back in the auxiliary floor-forming position.

Referring now to FIGURES 13 and 14, an alternative latch-actuating arrangement is shown in the form of a reciprocable control rod 74 that is connected to a hook arm 76 by a bell crank 78. A bracket 80 is fixed to the floor-forming panel 20 and rotatably supports the hook arm 76 and the bell crank 78. A spring 82 is provided to bias the hook arm to an unlatched position. The other end of the control rod is shown in FIGURES 15 and 16 to be connected to an actuator arm 84 rotatably mounted on a bracket 86 fixed to a vehicle body side panel. A spring clip 83 connects the control rod 74 and the actuator arm, and spring member 82 biases the actuator arm upwardly and outwardly into the path of the seat back 10 during its rotative movement from an upright position to the auxiliary floor-forming position as shown in phantom in FIGURE 16. As before, a key cylinder 38, locking plate 40 and striker flange 42 are provided to lock the seat in the auxiliary floor-forming position.

In operation of the latching means shown in FIGURES 1–8, the seat back 10 is rotated downwardly about the pivotal connection 14 to cause the auxiliary floor-forming panel 16 to slide downwardly on the roller member 30 until the outwardly curved portion 32 engages the roller member. The hook portion 36 of the plate 34 is thereby positioned behind the striker 28 of the roller pin 26 to prevent outward, upward movement of the auxiliary floor-forming panel 20 about the hinge 18 without movement of the seat back 10. In the floor-forming position the key cylinder 38 may be actuated to rotate the locking plate 40 into locking engagement with the striker flange 42 to prevent upward movement of the seat back and consequently the auxiliary floor-forming panel 16. In the modifications shown in FIGURES 9–16, the latching mechanism associated with the floor-forming panel 20 is actuated to a latching position through a control rod 52 or 74 that is connected to an actuator arm 64 or 84 positioned in the downward rotative path of the seat back 10. As the seat back is lowered into the auxiliary floor-forming position, the actuator arm 64 or 84 is forced downwardly against the bias of the associated spring means to actuate the control rod 52 or 74 and rotate the hook arm 53 or 76 into latching engagement with the striker 50 against the unlatching bias of the associated spring member. In the auxiliary floor-forming position the key cylinder 38 may be actuated to rotate the locking plate 40 beneath the striker flange 42 and secure the seat in the auxiliary floor-forming position.

It is to be understood that the phraseology and terminology employed herein is for the purpose of description and not of limitation. Accordingly, the invention is not intended to be limited in its application to the details of construction and arrangement of the parts illustrated in the accompanying drawings, except insofar as limited by the prior art and as defined by the appended claims.

We claim:

1. In foldable vehicle seat structure having auxiliary floor-forming portions associated therewith, a vehicle seat movable in a pivotal path from a normal occupant accommodating position to a collapsed auxiliary floor-forming position, means responsive to the position of said seat to latch said seat in said floor-forming position, said means comprising, roller means fixed to said vehicle, an auxiliary floor-forming plate pivotally fixed to said seat and slidably engaged with said roller means, a shaft rotatably supporting said roller means, a striker formed by an extension of said shaft, and latch means fixed to said plate and lockingly engageable with said striker when said plate is in the floor-forming position.

2. Apparatus as defined in claim 1 and having a locking plate rotatably fixed to said seat, a key cylinder associated with said locking plate, a striker flange fixedly secured adjacent the locking plate when said seat is in the auxiliary floor-forming position, and key means to rotate said locking plate into locking engagement with said striker flange.

3. In foldable vehicle seat apparatus having a pivotally supported seat back adapted for pivotal movement from an upright seat-forming position to a horizontal auxiliary floor-forming position, and comprising, an auxiliary floor-forming plate pivotally connected to said seat back and adapted to be parallelly supported closely adjacent the seat back in the upright seat-forming position, roller means rotatably secured adjacent the auxiliary floor-forming plate in the horizontal floor-forming position, said auxiliary floor-forming plate being slidably engageable with said roller means during the pivotal movement of said seat back, striker means associated with said roller means, and a latching member associated with said auxiliary floor plate and positioned for latching engagement with said striker means in the auxiliary floor-forming position.

4. The apparatus as defined in claim 3 and having latching means associated with said seat back in said auxiliary floor-forming position, and actuating mechanism to lock said seat back in said auxiliary floor-forming position.

5. In combination with a vehicle having a floor, a seat mounted for pivotal movement relative to said floor and having a auxiliary floor-forming portion, said seat being movable between an occupant accommodating seat-forming position and a folded floor-forming position, an auxiliary floor-forming plate pivotally mounted adjacent said auxiliary floor-forming portion, said auxiliary floor-forming plate being responsive to movement of said seat for movement from a stored position when said seat is in seat-forming position to an auxiliary floor-forming position when said seat is in floor-forming position, biasing means for automatically moving said auxiliary floor-forming plate between said positions, and latching means responsive to the position of said seat for securing said auxiliary floor-forming plate in said auxiliary floor-forming position, said latching means comprising a striker secured to said floor and a hook secured to said auxiliary floor-forming plate for coacting with said striker to secure said auxiliary floor-forming plate from movement when said seat is in said floor-forming position.

6. In combination with a vehicle having a floor member, a seat mounted for pivotal movement relative to said floor member, said seat being movable between an occupant accommodating seat-forming position and a folded floor-forming position, an auxiliary floor-forming member pivotally secured to said seat and slidably contacting said floor member, said auxiliary floor-forming member being responsive to movement of said seat for automatic movement from a stored position adjacent and substantially parallel to said seat when said seat is in seat-forming position to an extended auxiliary floor-forming position when said seat is moved to floor-forming position, and latching means responsive to the position of said seat for securing said auxiliary floor-forming member in said auxiliary floor-forming position, said latching means comprising a striker secured to one of said members and a hook secured to the other of said members being positioned thereon for engagement with said striker when said auxiliary floor-forming member is moved to extended position by the movement of said seat to folded floor-forming position.

7. The apparatus as claimed in claim 6 wherein said latching means includes a striker associated with said auxiliary floor-forming member, a latch control rod slidably supported beneath the floor-forming surfaces of said auxiliary floor-forming member and said seat in said folded floor-forming position, a latch arm rotatably supported beneath said auxiliary floor-forming member adjacent said striker, spring means biasing said latching arm to a position of disengagement relative to said striker, a bellcrank linking said control rod and said latch arm, an actuator arm pivotally supported beneath said seat in said floor-forming position and controllably linked to said control rod, means biasing said actuator arm to an upwardly extending position in the path of said seat during movement between said seat-forming position and said floor-forming position, and said seat contacting said actuator arm during movement from said seat-forming position to said floor-forming position for actuating said latching mechanism.

8. The apparatus as claimed in claim 6 wherein said latching means includes a striker bar secured to said floor member, a hook secured on said auxiliary member being positioned for engaging said striker bar when said auxiliary member is moved into said auxiliary floor-forming position by the movement of said seat into floor-forming position whereby said auxiliary plate is secured from all movement other than that initiated by said seat.

9. In combination with a foldable seat having a pivotal connection to a vehicle floor for movement from an upright seat-forming position to a folded floor-forming position, an auxiliary plate pivotally connected to said vehicle seat and responsive to movement of said seat for movement from a stored position when said seat is in seat-forming position to an auxiliary floor-forming plate position when said seat is in a folded floor-forming position, a pin secured to said floor, a roller member rotatably mounted on said pin for slidably contacting said auxiliary plate during movement between said stored position and said auxiliary floor-forming plate position, a hook secured on said auxiliary plate being positioned for engaging a portion of said pin when said auxiliary plate is slidably and pivotally moved into said auxiliary floor-forming plate position by the movement of said seat into floor-forming position whereby said auxiliary plate is secured from all movement other than that initiated by said seat.

References Cited by the Examiner

UNITED STATES PATENTS

| 2,927,818 | 3/1960 | Ferrara | 296—66 |
| 2,997,335 | 8/1961 | May | 296—66 |
| 3,008,755 | 11/1961 | Hale | 296—66 |
| 3,114,570 | 12/1963 | Farrow et al. | 296—66 |

FOREIGN PATENTS 928,506  6/1855  Germany.

BENJAMIN HERSH, *Primary Examiner.*

LEO FRIAGLIA, *Examiner.*

ROBERT C. PODWIL, *Assistant Examiner.*